US012806098B2

(12) United States Patent
Tanaka et al.

(10) Patent No.: US 12,806,098 B2
(45) Date of Patent: Nov. 24, 2026

(54) FLUID MATTRESS

(71) Applicant: Paramount Bed Co., Ltd., Tokyo (JP)

(72) Inventors: Makoto Tanaka, Tokyo (JP); Masakazu Harada, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 82 days.

(21) Appl. No.: 18/893,370

(22) Filed: Sep. 23, 2024

(65) Prior Publication Data

US 2025/0332049 A1 Oct. 30, 2025

(30) Foreign Application Priority Data

Apr. 30, 2024 (JP) ................................ 2024-074027

(51) Int. Cl.
*A61G 7/057* (2006.01)
*G05D 16/20* (2006.01)

(52) U.S. Cl.
CPC ..... *A61G 7/05776* (2013.01); *G05D 16/2022* (2019.01); *G05D 16/204* (2013.01)

(58) Field of Classification Search
CPC . A61G 7/05776; A61G 7/05769; A61G 7/057
See application file for complete search history.

(56) References Cited

U.S. PATENT DOCUMENTS 5,243,721 A * 9/1993 Teasdale ............ A61G 7/05776 5/713
10,070,733 B2 * 9/2018 Ohno ................. A61G 7/05776
10,334,959 B2 * 7/2019 Ohno ..................... A47C 27/10
2002/0016995 A1 * 2/2002 Cook ................. A61G 7/05776 5/713
2002/0050010 A1 * 5/2002 Shimada ............ A61G 7/05776 5/706
2004/0261182 A1 * 12/2004 Biggie ............... A61G 7/05776 5/713
2006/0236464 A1 * 10/2006 Beck .................. A61G 7/05776 5/713
2009/0144909 A1 * 6/2009 Skinner .............. A61G 7/05776 5/713
2011/0197366 A1 * 8/2011 Lachenbruch ..... A61G 7/05776 5/655.3
2011/0252570 A1 * 10/2011 Fraser ................ A61G 7/05776 5/713

(Continued)

FOREIGN PATENT DOCUMENTS

JP 2021-049435 A 4/2021

*Primary Examiner* — J. T. Newton
(74) *Attorney, Agent, or Firm* — Kim & Stewart LLP

(57) ABSTRACT

A fluid mattress includes a fluid supply unit, a fluid path, first cells, second cells, a first solenoid valve, a second solenoid valve, a pressure sensor, and a controller. The controller implements two modes by adjusting pressures in the cells and measures a duration of time during which a measurement value changes from a third pressure lower than a first pressure and higher than a second pressure to a fourth pressure lower than the third pressure and higher than the second pressure, and sets the first pressure based on the measured time. The first pressure is set to be a first value when the duration of time is a first duration of time and to be a second value greater than the first value when the duration of time is a second duration of time longer than the first duration of time.

10 Claims, 8 Drawing Sheets

(56) References Cited

U.S. PATENT DOCUMENTS

| | | | | |
|---|---|---|---|---|
| 2014/0223665 | A1* | 8/2014 | Chapin | A47C 27/10 5/710 |
| 2015/0000044 | A1* | 1/2015 | Morimura | A47C 27/083 5/710 |
| 2017/0086598 | A1* | 3/2017 | Ohno | A47C 27/083 |
| 2018/0160821 | A1* | 6/2018 | Chapin | A47C 27/083 |
| 2022/0054338 | A1* | 2/2022 | Shifrin | A61G 7/05776 |

* cited by examiner

T0
T1
T2
T3
AIR CELL 31
P1
P2
PRESSURE

AIR CELL 32
P1
P2
PRESSURE

AIR CELL 33
P1
P2
PRESSURE
TIME $$R = \frac{t2 - t0}{t1 - t2}$$

FLUID MATTRESS

CROSS-REFERENCE TO RELATED APPLICATIONS

This application is based upon and claims the benefit of priority from the prior Japanese Patent Application No. 2024-074027, filed on Apr. 30, 2024; the entire contents of which are incorporated herein by reference.

FIELD

Embodiments discussed herein relate to a fluid mattress.

BACKGROUND

Air mattresses may be disposed on beds in medical institutions such as a hospital. The air mattress includes a plurality of air cells, and the pressure in the air cells are controlled, so that the air mattress can maintain the user's comfort while sleeping. However, an optimal value of the pressure in the air cells differs in accordance with the physique of a user, and differs in accordance with a posture of the same user. It is difficult to keep the optimal value of the pressure in the air cells all the time.

DETAILED DESCRIPTION

Figure 1:
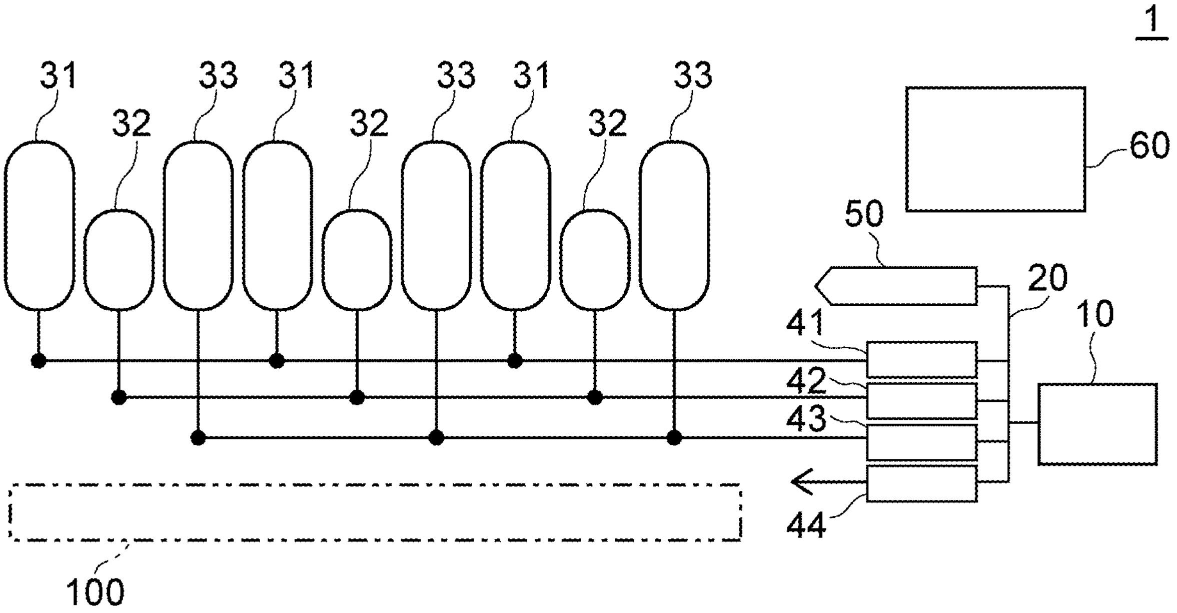
FIG. 1 is a diagram illustrating a fluid mattress according to a first embodiment.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component", "system" and the like are intended to refer to, or comprise, a computer-related entity or an entity related to an operational apparatus with one or more specific functionalities, wherein the entity can be either hardware, or a combination of hardware and software in execution.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software stored on a non-transitory electronic memory or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer-readable (or machine-readable) device or computer-readable (or machine-readable) storage/communications media having a computer program stored thereon. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In general, one aspect of the present application is a fluid mattress including:

- a fluid supply unit capable of supplying a fluid;
- a fluid path to which the fluid is supplied from the fluid supply unit;
- a plurality of first cells connected to each other;
- a plurality of second cells connected to each other;
- a first solenoid valve including a first end connected to the plurality of first cells and a second end connected to the fluid path;
- a second solenoid valve including a first end connected to the plurality of second cells and a second end connected to the fluid path;
- an external solenoid valve including a first end connected to an outside and a second end connected to the fluid path;
- a pressure sensor that measures a pressure of the fluid in the fluid path; and
- a controller that receives input of a measurement result by the pressure sensor, and controls the fluid supply unit, the first solenoid valve, the second solenoid valve, and the external solenoid valve, in which
- the controller can implement
  - a first mode in which a pressure in the second cell is set to be a first pressure, and a pressure in the first cell is set to be equal to or lower than a second pressure lower than the first pressure, and
  - a second mode in which a pressure in the first cell is set to be the first pressure, and a pressure in the second cell is set to be equal to or lower than the second pressure, and
- the controller, when implementing the second mode by shifting from the first mode, stops the fluid supply unit, causes the first solenoid valve to be in a closed state, causes the second solenoid valve and the external solenoid valve to be in an open state, determines the first pressure based on time during when a measurement value by the pressure sensor changes from a third pressure lower than the first pressure and higher than the second pressure to a fourth pressure lower than the third pressure and higher than the second pressure, and causes the first pressure to be higher as the time is longer.

First Embodiment

FIG. 1 is a diagram illustrating a fluid mattress according to a present embodiment.

As illustrated in FIG. 1, a fluid mattress 1 according to the present embodiment is placed and used on a medical bed 100, for example. A user gets on the fluid mattress 1. The fluid mattress 1 may be placed and used on a nursing bed. The nursing beds are used in care facilities and homes of users, in addition to the medical institution such as a hospital. The user of the fluid mattress 1 is, for example, a patient or a care recipient.

The fluid mattress 1 is provided with an air blowing apparatus 10, a fluid path 20, air cells 31 to 33, solenoid valves 41 to 44, a pressure sensor 50, and a controller 60. The air blowing apparatus 10 is a fluid supply unit capable of supplying the air as a fluid. The air blowing apparatus 10 may be a pump, for example. The fluid path 20 is connected to the air blowing apparatus 10, and is supplied with the air from the air blowing apparatus 10. In the present specification, "connection" indicates that the fluid can circulate.

Pluralities of the air cells 31 to 33 are provided, and the air cells 31 to 33 are arranged repeatedly along a direction from a head side toward a leg side of the medical bed 100. The air cells 31 to 33 are made of a soft sheet material, and can seal the air inside. For example, the air cells 31, 32, and 33 have the same sizes and the same shapes, respectively.

Each of the solenoid valves 41 to 44 includes a first end and a second end, and can switch whether to permit or prohibit the circulation of the air between the first end and the second end. The plurality of air cells 31 (first cells) are connected to each other, and are connected to the first end of the solenoid valve 41 (first solenoid valve). The plurality of air cells 32 (second cells) are connected to each other, and are connected to the first end of the solenoid valve 42 (second solenoid valve). The plurality of air cells 33 (third cells) are connected to each other, and are connected to the first end of the solenoid valve 43 (third solenoid valve).

In the fluid mattress 1, pluralities of air cells having the same sizes and the same shapes respectively and arranged on a line are divided into three flow paths by the solenoid valves 41 to 43. The first end of the solenoid valve 44 (external solenoid valve) is connected to an outside of the fluid mattress 1, and can suction or discharge the atmosphere as the air. The second ends of the solenoid valves 41 to 44 are connected to the fluid path 20.

The pressure sensor 50 measures a pressure of the air in the fluid path 20. The controller 60 receives input of a measurement result by the pressure sensor 50, and controls the air blowing apparatus 10 and the solenoid valves 41 to 44. The controller 60 can execute a bedsore prevention operation. In a case where the controller 60 executes the bedsore prevention operation, the controller 60 repeatedly executes a first mode, a second mode, and a third mode, which are described later. The controller 60 calculates and stores a correction factor k indicating the ease of the removal of the exhaust, such as the degree of opening of the solenoid valve 44 connected to the outside. The controller 60 stores correlations illustrated in FIGS. 6 to 8. These correlations are also described later.

Next, an operation of the fluid mattress 1 according to the present embodiment will be described.

Firstly, an overall operation of the fluid mattress 1 will be described.

Figure 2:
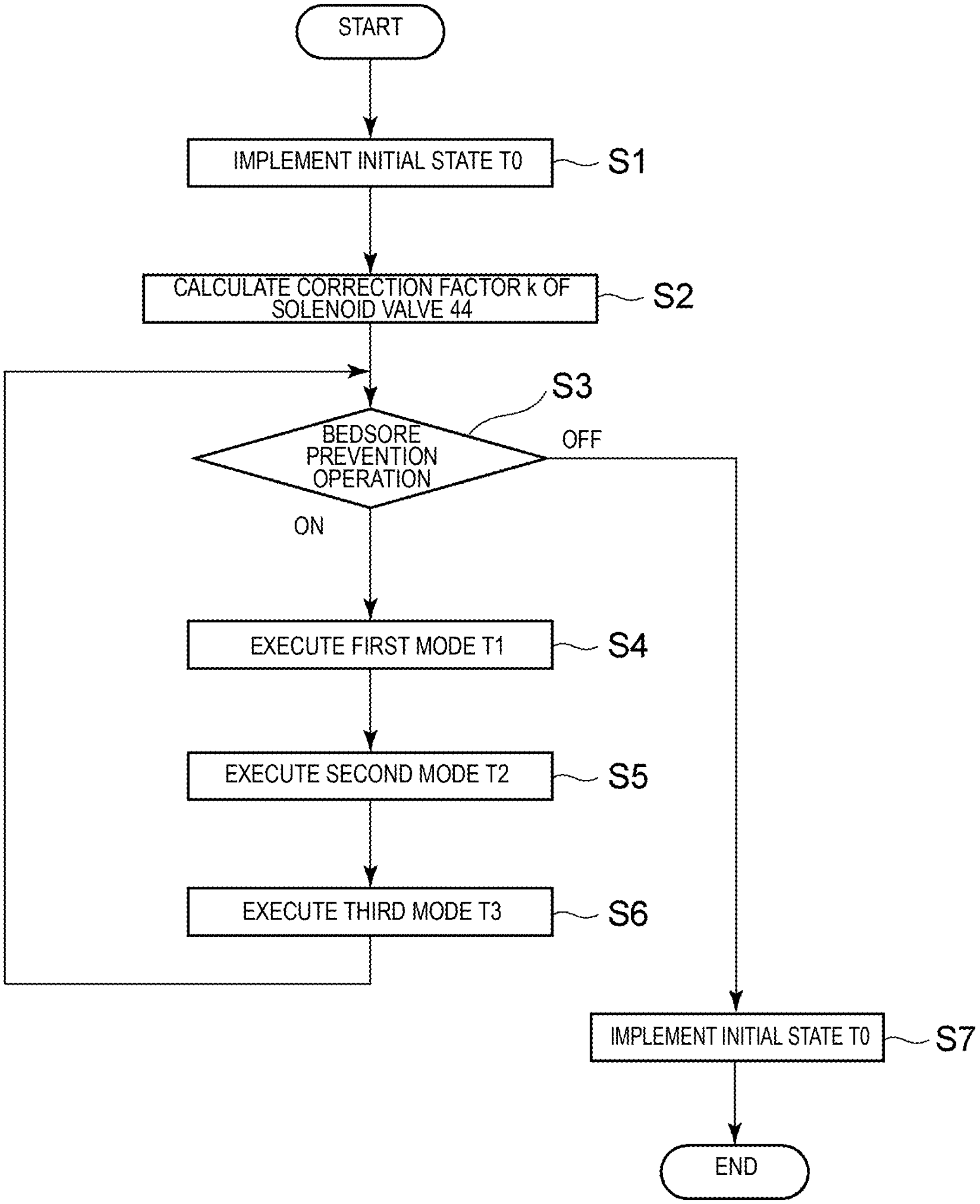
FIG. 2 is a flowchart illustrating an operation of the fluid mattress according to the first embodiment.

FIG. 2 is a flowchart illustrating an operation of the fluid mattress according to the present embodiment.

Figures 3A, 3B, 3C:
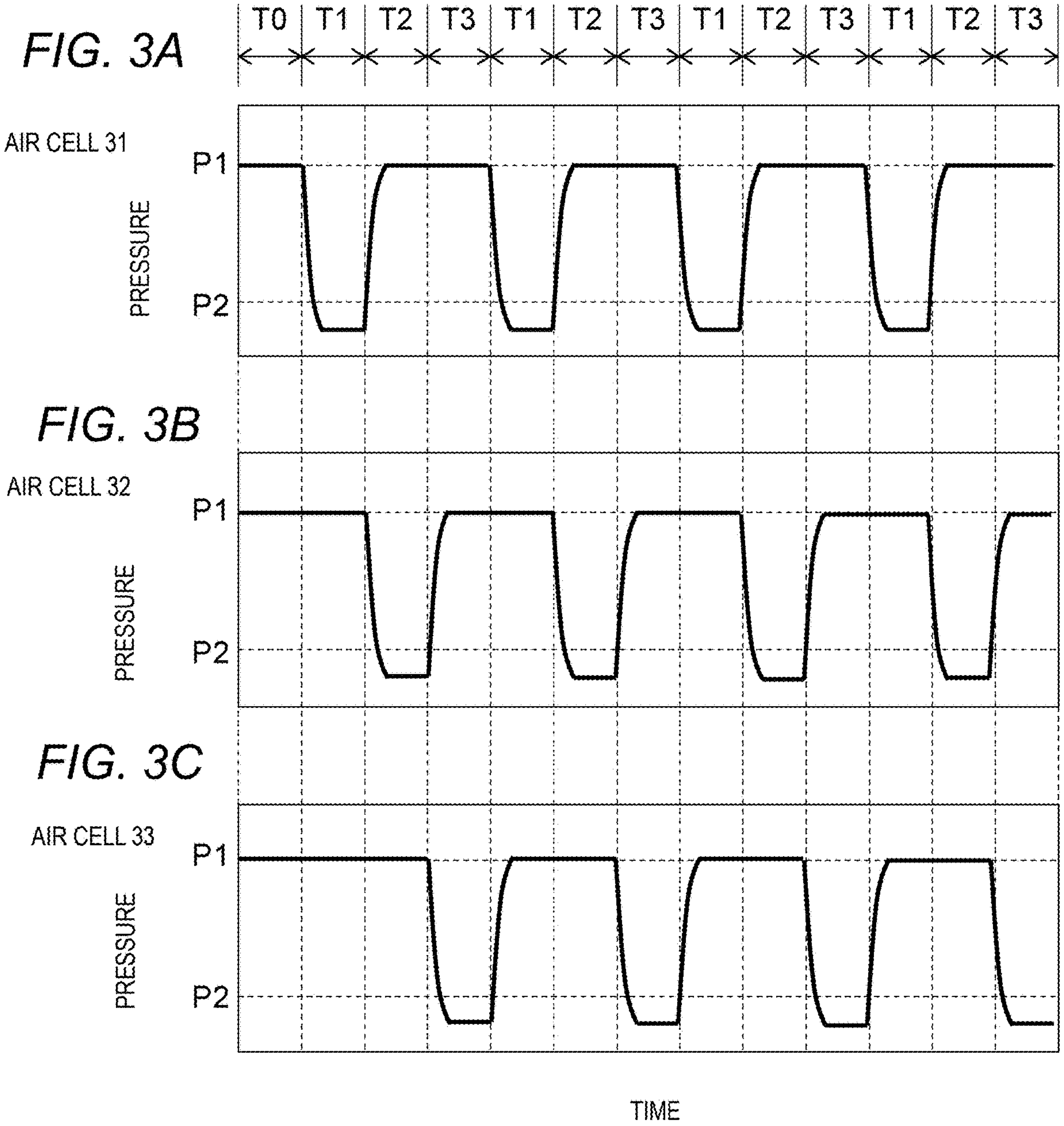
FIGS. 3A to 3C are graphs each illustrating a change in a pressure in each air cell, in which the horizontal axis represents time and the longitudinal axis represents a pressure in each air cell.

FIGS. 3A to 3C are graphs each indicating a change in the pressure in each air cell, in which the horizontal axis represents time and the longitudinal axis represents a pressure in each air cell: FIG. 3A illustrates a pressure change in the air cell 31; FIG. 3B illustrates a pressure change in the air cell 32; and FIG. 3C illustrates a pressure change in the air cell 33.

As illustrated at a step S1 in FIG. 2, and FIGS. 3A to 3C, the controller 60 implements an initial state TO. In the initial state TO, the controller 60 sets the internal pressures in all the air cells 31 to 33 to a first pressure P1. The first pressure P1 is a pressure to allow all the air cells 31 to 33 to be maintained in a moderately inflated state in a state where a user has gotten on the fluid mattress 1, and allow the air cells 31 to 33 to support the user comfortably. For example, the first pressure P1 is a pressure at which a contact area between the air cells 31 to 33 and the user is the maximum. In the initial state TO, the first pressure P1 is a value set in advance.

Next, as illustrated at a step S2 in FIG. 2, the controller 60 calculates a correction factor k indicating the degree of opening of the solenoid valve 44 connected to the outside. A calculation method of the correction factor k is described later.

Next, as illustrated at a step S3 in FIG. 2, the controller 60 determines whether the bedsore prevention operation is on or off. If the bedsore prevention operation is on, the controller 60 causes to the operation to proceed to a step S4.

At the step S4, the controller 60 executes a first mode T1. As illustrated in FIG. 1 and FIGS. 3A to 3C, in the first mode T1, the controller sets the pressures in the air cell 32 and the air cell 33 to the first pressure P1, and sets the pressure in the air cell 31 to be equal to or lower than a second pressure P2. The second pressure P2 is lower than the first pressure P1. The pressure in the air cell 31 is set to a pressure close to the atmosphere pressure, for example. The user is supported by the air cells 32 and 33, and is not supported by the air cell 31. The time of the first mode T1 is set to five minutes, for example.

Next, the controller 60 causes the operation to proceed to a step S5, and executes a second mode T2. In the second mode T2, the controller 60 returns the pressure in the air cell 31 to the first pressure P1, and sets the pressure in the air cell 32 to be equal to or lower than the second pressure P2. The pressure in the air cell 32 is set to a pressure close to the atmosphere pressure, for example. The user is supported by the air cells 31 and 33, and is not supported by the air cell 32. The time of the second mode T2 is set to five minutes, for example. FIG. 1 illustrates the second mode T2.

Next, the controller 60 causes the operation to proceed to a step S6, and executes a third mode T3. In the third mode T3, the controller 60 returns the pressure in the air cell 32 to the first pressure P1, and sets the pressure in the air cell 33 to be equal to or lower than the second pressure P2. The pressure in the air cell 33 is close to the atmosphere pressure, for example. The user is supported by the air cells 31 and 32, but is not supported by the air cell 33. The time of the third mode T3 is set to five minutes, for example.

Next, the controller 60 causes the operation to return to the step S3, and causes the operation to proceed to the step S4 again if the bedsore prevention operation is on, and repeats the first mode T1, the second mode T2, and the third mode T3. If the bedsore prevention operation is off, the controller 60 causes the operation to proceed to a step S7, implements the initial state TO, and then ends the operation. Also after the controller 60 has ended the operation, the controller 60 maintains the internal pressures in the air cells 31 to 33 to the first pressure P1.

If the bedsore prevention operation is on, the controller 60 sequentially decreases the internal pressures in the plurality of air cells 31, the plurality of air cells 32, the plurality of the air cells 33 to be equal to or lower than the second pressure P2. This moves a body of the user little by little relative to the fluid mattress 1, and moves a site in the body of the user that is not pressed by the air cells little by little to suppress the generation of bedsore.

Next, each operation will be described in details.

Firstly, an implementation method of the initial state TO illustrated at the step S1 in FIG. 2 will be described.

As illustrated in FIG. 1 and FIGS. 3A to 3C, in the initial state TO, the controller 60 causes the solenoid valves 41 to 43 to be in an open state and the solenoid valve 44 to be in a closed state, and drives the air blowing apparatus 10. The controller 60 injects the air from the air blowing apparatus 10 via the fluid path 20 and the solenoid valves 41 to 43 into the air cells 31 to 33. When a measurement value of the pressure sensor 50 has reached the first pressure P1, the controller 60 stops the air blowing apparatus 10. The controller 60 sets the solenoid valves 41 to 43 to the open state, so that the air cells 31 to 33 are connected to each other and are at the same pressure. In this manner, the pressures in all the air cells 31 to 33 are set to the first pressure P1.

Next, a calculation method of the correction factor k illustrated at the step S2 in FIG. 2 will be described.

Figure 4:
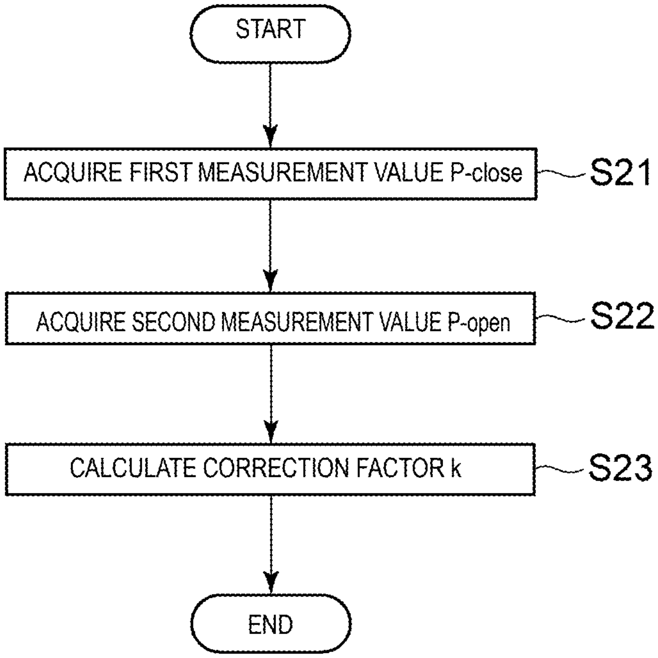
FIG. 4 is a flowchart illustrating a calculation method of a correction factor.

FIG. 4 is a flowchart illustrating a calculation method of a correction factor.

Firstly, as illustrated at a step S21 in FIG. 4, the controller 60 drives the air blowing apparatus 10, and causes the solenoid valves 41 to 44 to be in the closed state. In this state, the controller 60 causes the pressure sensor 50 to measure the pressure in the fluid path 20, and acquires a first measurement value P-close.

Next, as illustrated at a step S22 in FIG. 4, the controller 60 sets only the solenoid valve 44 to the open state. The solenoid valves 41 to 43 remain in the closed state. The controller 60 continuously drives the air blowing apparatus 10. In this state, the controller 60 causes the pressure sensor 50 to measure the pressure in the fluid path 20, and acquires a second measurement value P-open after the measurement value has become stable.

Next, as illustrated at a step S23 in FIG. 4, the controller 60 calculates the correction factor k indicating a circulation state of the solenoid valve 44 based on a value (P-close/P-open) of a ratio between the first measurement value P-close and the second measurement value P-open. The first measurement value P-close is determined mainly based on a performance of the air blowing apparatus 10.

The second measurement value P-open is determined mainly based on the performance of the air blowing apparatus 10 and the degree of opening of the solenoid valve 44. As the degree of opening of the solenoid valve 44 is larger, the resistance when the air passes through the solenoid valve 44 becomes lower, and the second measurement value P-open becomes lower. The value of the ratio (P-close/P-open) becomes larger, and the correction factor k becomes higher. On the other hand, as the degree of opening of the solenoid valve 44 is smaller, the resistance when the air passes through the solenoid valve 44 becomes higher, and the second measurement value P-open becomes higher. The value of the ratio (P-close/P-open) becomes smaller, and the correction factor k becomes lower. The controller 60 stores the correction factor k.

Next, a method of determining a set value of the first pressure P1 will be described.

In the present embodiment, the controller 60 calculates a first estimated value of the first pressure P1 when implementing the first mode T1 by shifting from the initial state TO or the third mode T3, calculates a second estimated value of the first pressure P1 when implementing the second mode T2 by shifting from the first mode T1, and calculates a third estimated value of the first pressure P1 when implementing the third mode T3 by shifting from the second mode T2. The controller 60 sets an average value of the first estimated value, the second estimated value, and the third estimated value, as a set value of the first pressure P1. The controller 60 may set a median value of the first estimated value, the second estimated value, and the third estimated value, as a set value of the first pressure P1. In this manner, a set value of the first pressure P1 is determined for every cycle composed of the first mode T1, the second mode T2, and the third mode T3.

Calculation methods of a first estimated value, a second estimated value, and a third estimated value are the same as each other. Hereinafter, an example of a method of calculating a second estimated value will be described.

Figure 5:
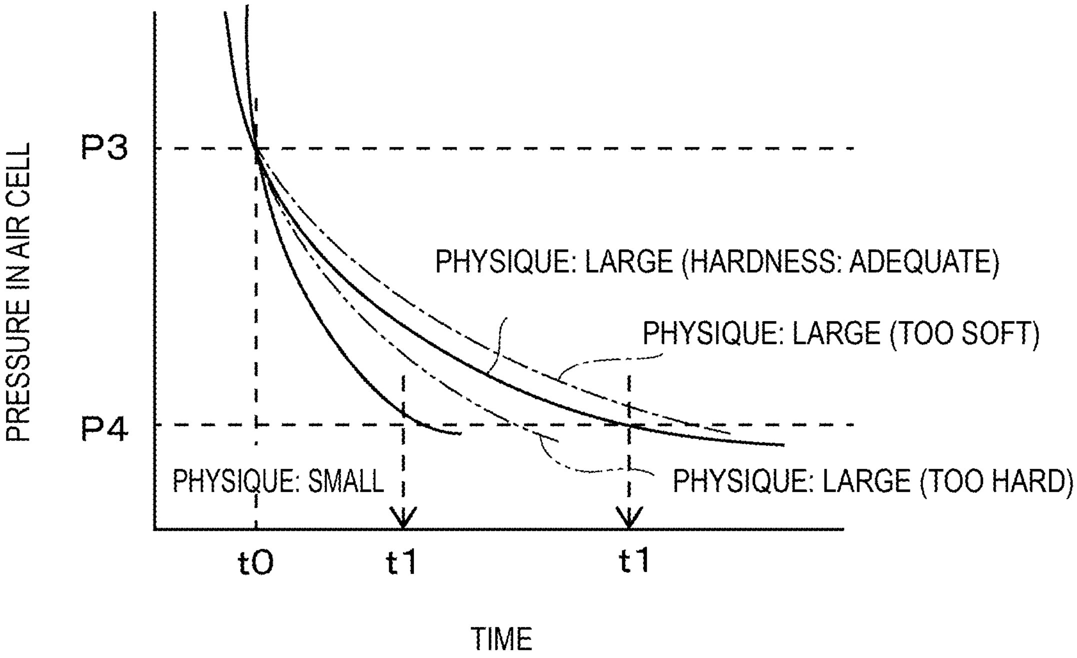
FIG. 5 is a graph illustrating a pressure change when the air is exhausted, in which the horizontal axis represents time and the longitudinal axis represents a pressure in the air cell.

FIG. 5 is a graph illustrating a pressure change when the air is exhausted, in which the horizontal axis represents time and the longitudinal axis represents a pressure in the air cell.

Figure 6:
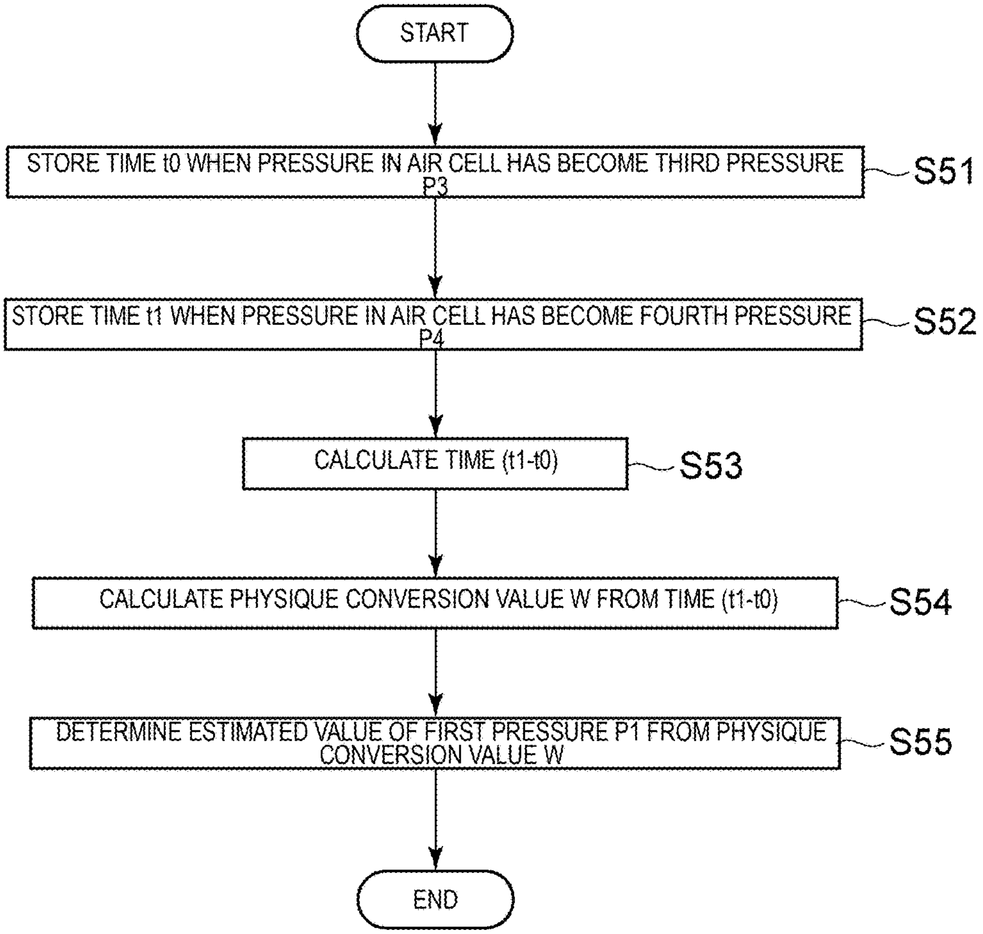
FIG. 6 is a flowchart illustrating a calculation method of an estimated value of a first pressure.

FIG. 6 is a flowchart illustrating a calculation method of an estimated value of a first pressure.

Figure 7:
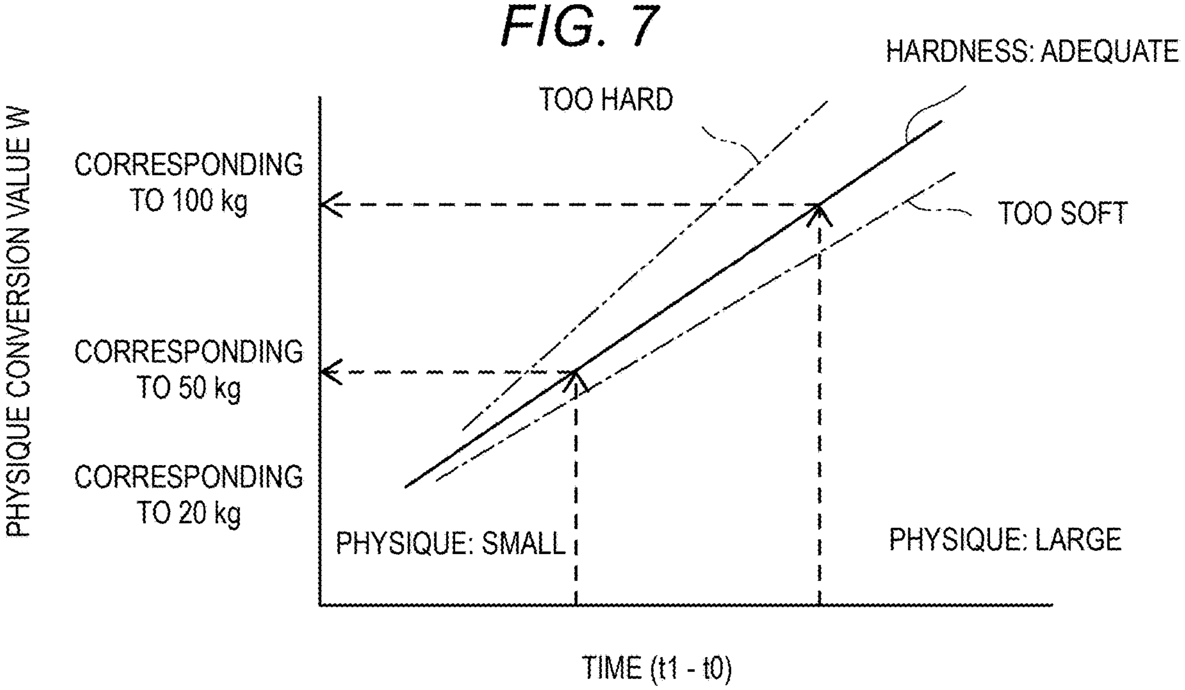
FIG. 7 is a graph illustrating an estimation method of a physique conversion value, in which the horizontal axis represents discharge time, and the longitudinal axis represents a physique conversion value of a user.

FIG. 7 is a graph illustrating an estimation method of a physique conversion value, in which the horizontal axis represents discharge time, and the longitudinal axis represents a physique conversion value of a user.

Figure 8:
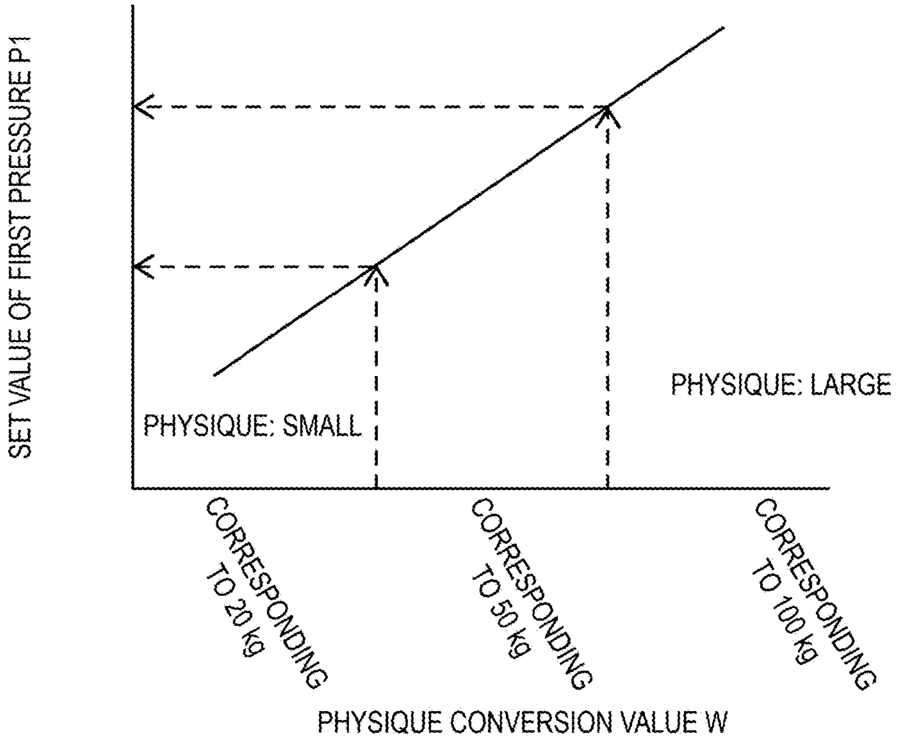
FIG. 8 is a graph illustrating a determination method of a first pressure, in which the horizontal axis represents a physique conversion value and the longitudinal axis represents a set value of the first pressure.

FIG. 8 is a graph illustrating a determination method of a first pressure, in which the horizontal axis represents a physique conversion value and the longitudinal axis represents a set value of the first pressure.

The controller 60, when implementing the second mode T2 by shifting from the first mode T1, stops the air blowing apparatus 10, causes the solenoid valves 41 and 43 to be in the closed state, and causes the solenoid valve 42 and the solenoid valve 44 to be in the open state. This connects the air cells 32 to the outside. At this time, the user crushes the air cells 32 to discharge the air to the outside from the air cells 32.

As illustrated in FIG. 5, as the air is discharged to the outside from the air cells 32, the pressure in the air cells 32 decreases. The speed of decreasing the pressure depends on the physique of the user and the first pressure P1 in the air cells 31 and 33. The lager physique of the user requires the longer time necessary for discharging the air. This is because the larger amount of the air is discharged during when the pressure reaches a fourth pressure P4 from a third pressure P3 as the physique of the user is larger, and the time required for the discharge is longer, while the solenoid valve 44 limits the passing speed of the air.

As illustrated by a dot-and-dash line in FIG. 5, when the first pressure P1 in the air cells 31 and 33 is lower than an adequate value, and the air cells 31 and 33 are too soft, the larger amount of the air is discharged during when the pressure in the air cell 32 reaches the fourth pressure P4 from the third pressure P3, and the time of the discharge becomes longer. On the other hand, as illustrated by a dash-dot-dot line in FIG. 5, when the first pressure P1 in the air cells 31 and 33 is higher than an adequate value, and the air cells 31 and 33 are too hard, the smaller amount of the air is discharged during when the pressure in the air cell 32 reaches the fourth pressure P4 from the third pressure P3, and the time of the discharge becomes shorter.

The "physique" of the user is a concept indicating a force to be applied to the air cells when the user is present on the fluid mattress 1. The physique largely depends on a body weight of the user, but is not a concept that is determined only based on the body weight. The physique also depends on the weight of bedding and a contact area between the fluid mattress 1 and the user. The contact area depends on a posture of the user and a state of the medical bed 100. The posture of the user includes, for example, a supine position and a sitting position. The state of the medical bed 100 includes a flat state, a back-raised state, a leg-raised state, and the like. The discharge time also depends on the degree of opening of the solenoid valve 44. The discharge time also depends on the abovementioned correction factor k.

As illustrated in FIG. 5, in the present embodiment, the third pressure P3 and the fourth pressure P4 are set. The third pressure P3 is lower than the first pressure P1 and higher than the second pressure P2. The fourth pressure P4 is lower than the third pressure P3 and higher than the second pressure P2. P1>P3>P4>P2 is obtained. In one example, the first pressure P1 is a pressure obtained by adding approximately 3 kPa (kilopascal) to the atmosphere pressure, the third pressure P3 is a pressure obtained by adding 2 kPa to the atmosphere pressure, the fourth pressure P4 is a pressure obtained by adding 0.7 kPa to the atmosphere pressure, and the second pressure P2 is a pressure obtained by adding 0.4 kPa to the atmosphere pressure. The atmosphere pressure is approximately 101 kPa.

As illustrated in FIG. 5, and at a step S51 in FIG. 6, the controller 60 stores time to when a measurement value of the pressure sensor 50 has become the third pressure P3. Next, as illustrated at a step S52, the controller 60 stores time t1 when the measurement value of the pressure sensor 50 has become the fourth pressure P4. As illustrated at a step S53, the controller 60 calculates time (t1−t0) during when the pressure in the air cell 32 changes from the third pressure P3 to the fourth pressure P4.

As illustrated at a step S54 in FIG. 6, the controller 60 estimates a physique conversion value W based on the time (t1−t0). The "physique conversion value W" is a numerical value indicating the physique of the user. FIG. 7 illustrates a correlation between the time (t1−t0) during when the pressure in the air cell 31 changes from the third pressure P3 to the fourth pressure P4, and the physique conversion value W. As illustrated in FIG. 7, the controller 60 estimates the larger physique conversion value W as the time (t1−t0) is longer. As mentioned above, the correlation also depends on the hardness of the air cells 31 and 33, that is, the first pressure P1. The correlation also depends on the correction factor k. The controller 60 stores the correlation in association with the first pressure P1 and the correction factor k. The controller 60 may store a multiple regression analysis result of the time (t1−t0), the first pressure P1, the correction factor k, and the physique conversion value W. In this manner, the controller 60 estimates the physique conversion value W based on the first pressure P1 and the correction factor k, in addition to the time (t1−t0).

FIG. 8 illustrates a correlation between the physique conversion value W and a set value of the first pressure P1. The controller 60 stores the correlation. As illustrated at a step S55 in FIG. 6, and in FIG. 8, the controller 60 calculates a set value of the first pressure P1 from the physique conversion value W. As the physique conversion value W is larger, the set value of the first pressure P1 becomes larger. As the time difference (t1−t0) is longer, the set value of the first pressure P1 becomes higher. In this manner, in the second mode T2, a second estimated value of the first pressure P1 is calculated.

Similarly, the controller 60 calculates a first estimated value in the first mode T1. The controller 60, when implementing the first mode T1 by shifting from the initial state TO or the third mode T3, stops the air blowing apparatus 10, causes the solenoid valves 42 and 43 to be in the closed state, causes the solenoid valves 41 and 44 to be in the open state, and calculates a first estimated value of the first pressure P1 based on the time (t1−t0) during when the measurement value of the pressure sensor 50 changes from the third pressure P3 to the fourth pressure P4.

In the third mode T3, the controller 60 calculates a third estimated value. The controller 60, when implementing the third mode T3 by shifting from the second mode T2, stops the air blowing apparatus 10, causes the solenoid valves 41 and 42 to be in the closed state, causes the solenoid valves 43 and 44 to be in the open state, and calculates a third estimated value of the first pressure P1 based on the time (t1−t0) during when the measurement value of the pressure sensor 50 changes from the third pressure P3 to the fourth pressure P4. The controller 60 sets an average value of the first estimated value, the second estimated value, and the third estimated value, as a set value of the first pressure P1. In the following operation, the controller 60 implements the first pressure P1 in accordance with the set value. At a step S7 in FIG. 2, the controller 60 sets the pressure in the air cells 31 to 33 to the first pressure P1 set last time.

Next, effects of the present embodiment will be described.

In the present embodiment, an external force that acts on the air cells based on the exhaust time from the air cells is evaluated as a concept of a physique conversion value, and a first pressure is set based on the physique conversion value. An optimal value of the first pressure can be set. This can cause the pressure in the air cells to be closer to the optimal value.

Meanwhile, it can also be considered that a set value of the first pressure is determined based on the body weight of a user. However, as mentioned above, an optimal value of the first pressure depends not only on the body weight, but also on the weight of bedding, the posture of the user, a state of the medical bed, and the like. The first pressure that is set only based on the body weight may be deviated from an optimal value. A first pressure needs to be reset every time the user changes.

With the present embodiment, the bedsore prevention operation is used to estimate an optimal value of the first pressure. A dedicated operation for obtaining a set value of the first pressure does not need to be performed. The set value of the first pressure can be determined for every cycle of the bedsore prevention operation, so that even if the posture of the user and the state of the medical bed are changed, the first pressure can be adjusted by following the change. The state of the air cells can be maintained to a state close to the optimal state all the time.

Furthermore, in the present embodiment, at the step S2 in FIG. 2, the controller 60 calculates the correction factor k indicating the degree of opening of the solenoid valve 44, and selects the correlation illustrated in FIG. 7 based on the correction factor k. Even if the degree of opening of the solenoid valve 44 varies, the first pressure can be set accurately.

Still furthermore, in the present embodiment, the controller 60 calculates a first estimated value when implementing the first mode by shifting, calculates a second estimated value when implementing the second mode by shifting, calculates a third estimated value when implementing the third mode by shifting, and sets an average value of these estimated values as a set value of the first pressure. Even when local variations are present in the pressure to be applied to the air cells, the influence can be dispersed, and the first pressure can be set accurately.

In the present embodiment, at the process illustrated at the step S54 in FIG. 6, the example in which the physique conversion value W is estimated based on the time (t1−t0), the first pressure P1, and the correction factor k has been described; however, at least one of the first pressure P1 and the correction factor k does not need to be considered.

Second Embodiment

Figure 9:
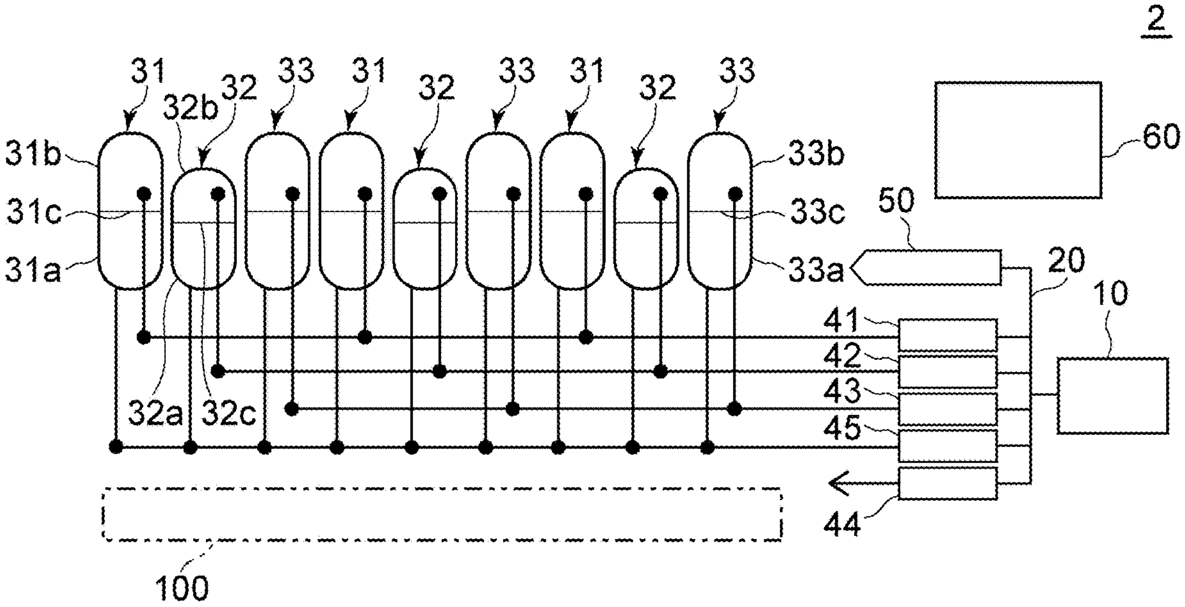
FIG. 9 is a diagram illustrating a fluid mattress according to a second embodiment.

FIG. 9 is a diagram illustrating a fluid mattress according to a present embodiment.

As illustrated in FIG. 9, in a fluid mattress 2 according to the present embodiment, each air cell is divided into two stages of upper and lower cells. The fluid mattress 2 is provided with a solenoid valve 45 (fourth solenoid valve).

Specifically, each air cell 31 is provided with a lower sub-cell 31*a* and an upper sub-cell 31*b*. For example, one lower sub-cell 31*a* and one upper sub-cell 31*b* are joined via a diaphragm 31*c*. Similarly, each air cell 32 is provided with a lower sub-cell 32*a*, an upper sub-cell 32*b*, and a diaphragm 32*c*, and each air cell 33 is provided with a lower sub-cell 33*a*, an upper sub-cell 33*b*, and a diaphragm 33*c*.

The solenoid valve 41 is connected to the upper sub-cell 31*b* of the air cell 31. The solenoid valve 42 is connected to the upper sub-cell 32*b* of the air cell 32. The solenoid valve 43 is connected to the upper sub-cell 33*b* of the air cell 33. A first end of the solenoid valve 45 is commonly connected to all the lower sub-cells 31*a*, 32*a*, and 33*a*. A second end of the solenoid valve 45 is connected to the fluid path 20. This can independently control the pressure of the upper stage and the pressure of lower stage in each air cell.

The pressure in each of the lower sub-cells 31*a*, 32*a*, and 33*a* is maintained to the first pressure P1 all the time. In the bedsore prevention operation, the pressure in each of the upper sub-cells 31*b*, 32*b*, and 33*b* is sequentially caused to be a pressure equal to or lower than the second pressure P2.

With the present embodiment, the lower sub-cells 31*a*, 32*a*, and 33*a* can be in an inflated state all the time, so that even in a case where the upper sub-cells are crushed, the user is supported by the lower sub-cells. This can provide more comfortable sleep comfort to the user by preventing the user from contacting with sections of the medical bed 100. The configurations, operations, and effects other than the above in the present embodiment are similar to those in the first embodiment. In the present embodiment, the example in which the lower sub-cell is disposed directly below the upper sub-cell has been discussed; however, a lower sub-cell may be disposed directly below between the adjacent upper sub-cells.

Third Embodiment

The present embodiment is an example in which the problem in the abovementioned first embodiment and second embodiment is solved.

Firstly, the problem will be described.

In a case where a user is present on the fluid mattress 1 or 2, when the user takes the sitting position or the medical bed 100 is in the back-raised state, the body weight of the user is applied to a small number of air cells in a concentrated manner. In the operation described in the first embodiment, when the pressure in the air cells or in the upper sub-cells is reduced from the first pressure P1 to the second pressure P2, the total amount of the air to be discharged from the air cells becomes smaller than that in a case where the user takes the supine position. Also in a case of a patient with a hump back or a contracture, the body weight of the user is applied to a small number of air cells in a concentrated manner.

In the algorithm in which the set value of the first pressure P1 is determined mentioned above, the time (t1−t0) becomes shorter, the smaller physique conversion value W is estimated, and the lower first pressure P1 is set. As a result, for example, in the second mode T2, the pressure in the air cells 31 and 33 decreases, the upper surface and the lower surface of the air cell are brought into contact with each other, and the user cannot be supported. Hereinafter, the upper surface and the lower surface of the air cell or the sub-cell being brought into contact with each other is called "bottoming".

For example, in a case where the fluid mattress 2 according to the second embodiment is used, the upper sub-cells 31*b* and 33*b* are bottomed, and the user is in a state of being supported by the lower sub-cells 31*a*, 32*a*, and 33*a*. In this case, no pressure is applied to the upper sub-cell 32*b* accordingly to substantially stop the discharge of air from the upper sub-cell 32*b*. In a case where the fluid mattress 1 according to the first embodiment is used, the air cells 31 and 33 are bottomed and the user contacts with the sections of the medical bed 100. Also in this case, no pressure is applied to the air cell 32 accordingly to substantially stop the discharge of air from the air cell 32.

When the discharge of air is stopped, the time (t1−t0) becomes shorter, the physique conversion value W also becomes smaller, and the set value of the first pressure P1 becomes lower. When the first pressure P1 becomes lower, the discharge amount of air further decreases. Such a cycle is repeated to decrease the set value of the first pressure P1, the lower sub-cells 31*a*, 32*a*, and 33*a* are eventually bottomed also in the fluid mattress 2 and cannot support the user, and the user is contacted with the sections of the medical bed 100.

In the present embodiment, the controller 60 determines a posture of the user, and increases the first pressure P1 by the constant amount if the posture is not the supine position. This prevents the abovementioned cycle from occurring, and continuously sets the suitable first pressure P1.

Hereinafter, a driving method in the present embodiment will be specifically described.

In the present embodiment, as a fluid mattress, the fluid mattress 2 described in the second embodiment is used.

Figure 10:
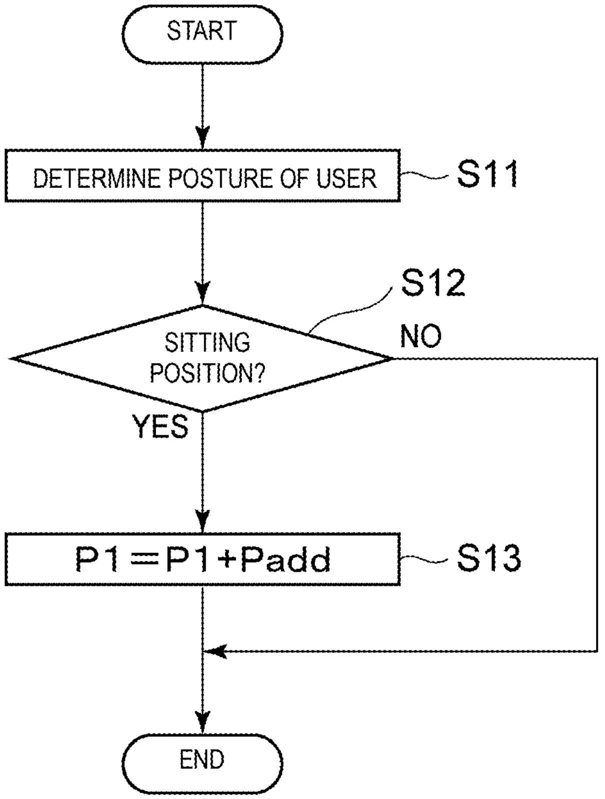
FIG. 10 is a flowchart illustrating an operation of a fluid mattress according to a third embodiment.

FIG. 10 is a flowchart illustrating an operation of the fluid mattress according to the present embodiment.

Figure 11:
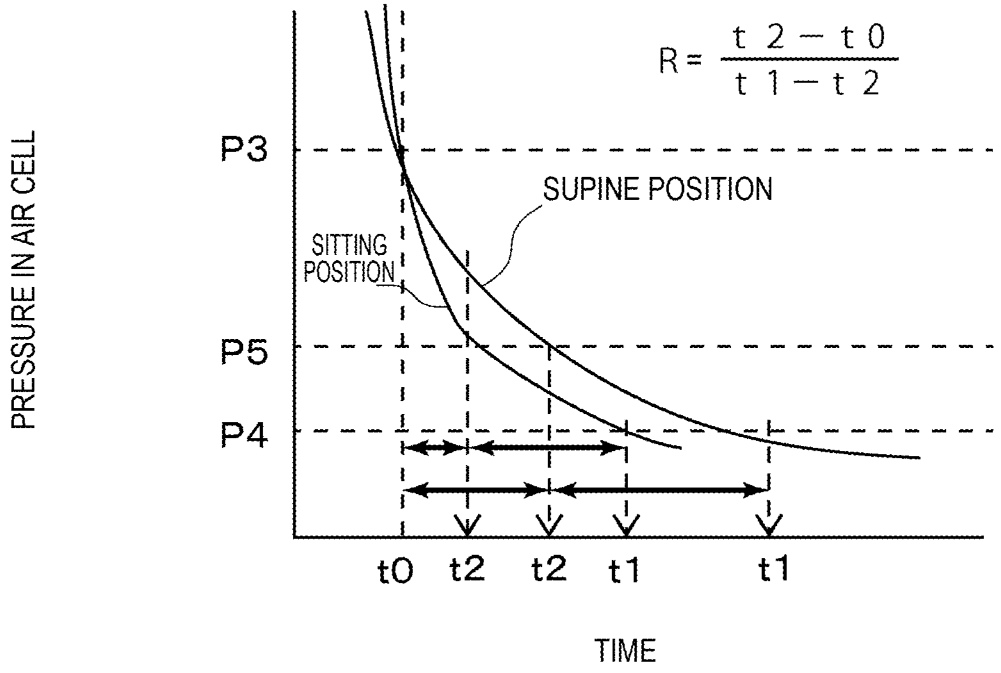
FIG. 11 is a graph illustrating a pressure change when the air is exhausted, in which the horizontal axis represents time and the longitudinal axis represents a pressure in the air cell.

FIG. 11 is a graph illustrating a pressure change when the air is exhausted, in which the horizontal axis represents time and the longitudinal axis represents a pressure in the air cell.

Figure 12:
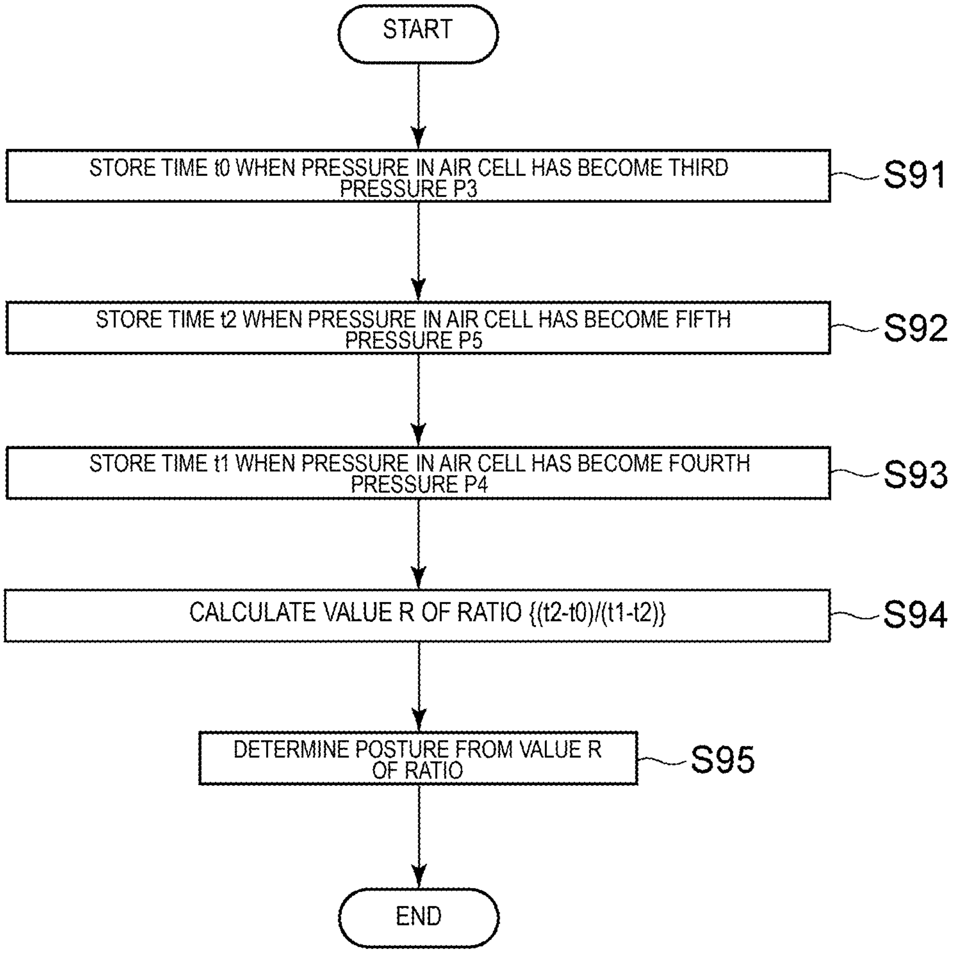
FIG. 12 is a flowchart illustrating a determination method of a posture of a user.

FIG. 12 is a flowchart illustrating a determination method of a posture of a user.

Figure 13:
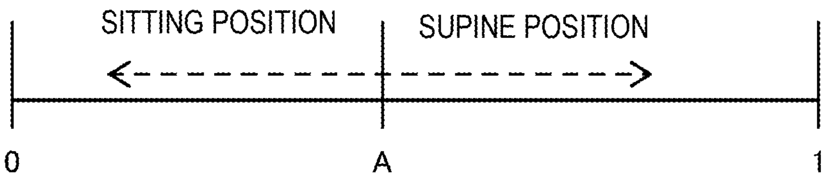
FIG. 13 is a diagram illustrating the determination method of the posture of the user.

FIG. 13 is a diagram illustrating the determination method of the posture of the user.

As illustrated at a step S11 in FIG. 10, the controller 60 determines a posture of a user who is present on the fluid mattress.

As illustrated in FIG. 11, any of one line among the upper sub-cells 31*b*, 32*b*, and 33*b* is connected to the outside, the shape of a pressure change curve when the air is exhausted to the outside from the upper sub-cell differs in accordance with the posture of the user. Specifically, in a case of a sitting position or a back-raised posture (hereinafter, collectively called "sitting position"), in comparison with the supine position, the load is concentrated on the specific upper sub-cell, the air is discharged from the upper sub-cell for a short time, and the upper sub-cell is bottomed. When the upper sub-cell is bottomed, a pressure change in the upper sub-cell suddenly becomes smaller, and the inclination of the pressure change curve becomes smaller. By detecting whether such an inflection point is present in the pressure change curve, whether the upper sub-cell is bottomed can be determined.

In the present embodiment, the shape of the pressure change curve is converted into a numerical value, and the numerical value is compared with a threshold to determine the presence or absence of bottoming, and determine a posture of the user. Specifically, a fifth pressure P5 is set between the third pressure P3 and the fourth pressure P4. P1>P3>P5>P4>P2 is set.

For example, in a state where the user has gotten on the fluid mattress 2, the controller 60 stops the air blowing apparatus 10, causes the solenoid valves 41 and 44 to be in the open state, and causes the solenoid valves 42, 43, and 45 to be in the closed state. This connects the upper sub-cell 31*b* of the air cell 31 to the outside, and starts discharging the air. The pressure sensor 50 measures the pressure in the fluid path 20, and cyclically outputs the result to the controller 60.

As illustrated in FIG. 11, and at a step S91 in FIG. 12, the controller 60 stores time to when a pressure in the upper sub-cell 31*b* has become the third pressure P3.

Next, as illustrated at a step S92, the controller 60 stores time t2 when the pressure in the upper sub-cell 31*b* has become the fifth pressure P5.

Next, as illustrated at a step S93, the controller 60 stores time t1 when the pressure in the upper sub-cell 31*b* has become the fourth pressure P4.

Next, as illustrated at a step S94, the controller 60 calculates first time (t2−t0) during when the pressure in the upper sub-cell 31*b* changes from the third pressure P3 to the fifth pressure P5 and second time (t1−t2) during when the pressure in the upper sub-cell 31*b* changes from the fifth pressure P5 to the fourth pressure P4, and calculates a value R=(t2−t0)/(t1−t2) of a ratio of the first time relative to the second time.

Next, as illustrated at a step S95 in FIG. 12, and in FIG. 13, the controller 60 compares the value R of the ratio with a threshold A. The controller 60 determines that the posture of the user is the supine position if the value R of the ratio is higher than the threshold A, and determines that the posture of the user is the sitting position if the value R of the ratio is lower than the threshold A.

Next, the controller 60 causes the operation to proceed to a step S12 in FIG. 10, and ends the operation without any change if the posture of the user is not the sitting position. The controller 60 causes the operation to proceed to a step S13 if the posture of the user is the sitting position, and newly sets a value (P1+Padd) obtained by adding an additional pressure Padd to the already set first pressure P1 as the first pressure P1. Thereafter, the controller 60 ends the operation.

If the posture of the user has been returned to the supine position, the step S13 in FIG. 10 is not executed, so that the set value of the first pressure P1 is returned to a value to which no additional pressure Padd is added. The controller 60 may perform the operation illustrated in FIG. 10 when determining the set value of the first pressure P1, or may perform independently.

With the present embodiment, the controller 60 determines a posture of the user, and increases the first pressure P1 if the posture of the user is the sitting position (including the back-raised state). This can appropriately support the user even in a case where the load is concentrated to a part of the upper sub-cells, and can prevent the cycle in which the first pressure P1 is erroneously set to be lower from occurring. As a result, the suitable first pressure P1 can be continuously set.

With the present embodiment, the fluid mattress 2 is used to allow the user to be supported by the lower sub-cells even in a case where the upper sub-cells are bottomed. This can prevent the user from feeling discomfort. In a case where the discomfort of the user can be resolved with some sort of means, in the present embodiment, the fluid mattress 1 according to the first embodiment may be used. The configurations, operations, and effects other than the above in the present embodiment are similar to those in the first embodiment.

The aforementioned respective embodiments are examples embodying the present disclosure, and the present disclosure is not limited to these embodiments. For example, in each of the aforementioned embodiments, the present disclosure also includes additions, deletions, or modifications of some elements or steps.

For example, each of the aforementioned embodiments has shown the example in which three lines of the air cells are provided, but is not limited thereto. Two, or four or more lines of the air cells may be provided. Each of the aforementioned embodiments has shown the example in which a plurality of air cells are arranged along one direction from a head side toward a leg side of a medical bed, but is not limited thereto. A plurality of air cells may be arranged along a left and right direction. For example, each of the aforementioned embodiments has shown the example in which the air is used as a fluid to drive the cell, but is not limited thereto. For example, as a fluid, water, gel, or oil may be used. Each air cell having a suitable size in accordance with a portion to be arranged on the bed and a function to be required is selected as appropriate, and even in one fluid mattress, a plurality of air cells having different sizes may be used in combination.

The present disclosure includes the following aspects.

Appendix 1

A fluid mattress including:

a fluid supply unit capable of supplying a fluid;

a fluid path to which the fluid is supplied from the fluid supply unit;

a plurality of first cells connected to each other;

a plurality of second cells connected to each other;

a first solenoid valve including a first end connected to the plurality of first cells and a second end connected to the fluid path;

a second solenoid valve including a first end connected to the plurality of second cells and a second end connected to the fluid path;

an external solenoid valve including a first end connected to an outside and a second end connected to the fluid path;

a pressure sensor that measures a pressure of the fluid in the fluid path; and a controller that receives input of a measurement result by the pressure sensor, and controls the fluid supply unit, the first solenoid valve, the second solenoid valve, and the external solenoid valve, in which the controller can implement a first mode in which a pressure in the second cell is set to be a first pressure, and a pressure in the first cell is set to be equal to or lower than a second pressure lower than the first pressure, and a second mode in which a pressure in the first cell is set to be the first pressure, and a pressure in the second cell is set to be equal to or lower than the second pressure, and the controller, when implementing the second mode by shifting from the first mode, stops the fluid supply unit, causes the first solenoid valve to be in a closed state, causes the second solenoid valve and the external solenoid valve to be in an open state, determines the first pressure based on time during when a measurement value by the pressure sensor changes from a third pressure lower than the first pressure and higher than the second pressure to a fourth pressure lower than the third pressure and higher than the second pressure, and causes the first pressure to be higher as the time is longer.

Appendix 2

The fluid mattress according to Appendix 1, further including:

a plurality of third cells connected to each other; and a third solenoid valve including a first end connected to the plurality of third cells and a second end connected to the fluid path, in which the controller can implement a third mode in which a pressure in the first cell and a pressure in the second cell are set to be the first pressure, and a pressure in the third cell is set to be equal to or lower than the second pressure, and causes the pressure in the third cell to be the first pressure, in the first mode and the second mode.

Appendix 3

The fluid mattress according to Appendix 2, in which the controller when implementing the first mode by shifting, stops the fluid supply unit, causes the second solenoid valve and the third solenoid valve to be in the closed state, causes the first solenoid valve and the external solenoid valve to be in the open state, and calculates a first estimated value of the first pressure based on time during when the measurement value by the pressure sensor changes from the third pressure to the fourth pressure, when implementing the second mode by shifting, stops the fluid supply unit, causes the first solenoid valve and the third solenoid valve to be in the closed state, causes the second solenoid valve and the external solenoid valve to be in the open state, and calculates a second estimated value of the first pressure based on time during when the measurement value by the pressure sensor changes from the third pressure to the fourth pressure, when implementing the third mode by shifting, stops the fluid supply unit, causes the first solenoid valve and the second solenoid valve to be in the closed state, causes the third solenoid valve and the external solenoid valve to be in the open state, and calculates a third estimated value of the first pressure based on time during when the measurement value by the pressure sensor changes from the third pressure to the fourth pressure, and sets an average value of the first estimated value, the second estimated value, and the third estimated value to the first pressure.

Appendix 4

The fluid mattress according to Appendix 2 or 3, in which

The fluid mattress is disposed on a bed, and the first cell, the second cell, and the third cell are repeatedly arranged from a head side toward a leg side of the bed.

Appendix 5

The fluid mattress according to any one of Appendixes 2 to 4, further including a fourth solenoid valve, in which the first cell includes a first lower cell connected to a first end of the fourth solenoid valve, and a first upper cell disposed above the first lower cell, and connected to the first end of the first solenoid valve, the second cell includes a second lower cell connected to the first end of the fourth solenoid valve, and a second upper cell disposed above the second lower cell, and connected to the first end of the second solenoid valve, the third cell includes a third lower cell connected to the first end of the fourth solenoid valve, and a third upper cell disposed above the third lower cell, and connected to the first end of the third solenoid valve, and a second end of the fourth solenoid valve is connected to the fluid path.

Appendix 6

The fluid mattress according to any one of Appendixes 2 to 5, in which the controller repeatedly implements the first mode, the second mode, and the third mode.

Appendix 7

The fluid mattress according to any one of Appendixes 1 to 6, in which the controller determines the first pressure based on a pressure in the first cell when implementing the second mode by shifting from the first mode.

Appendix 8

The fluid mattress according to any one of Appendixes 1 to 7, in which the controller drives the fluid supply unit, causes the first solenoid valve, the second solenoid valve, and the external solenoid valve to be in the closed state, and causes the pressure sensor to acquire a first measurement value, drives the fluid supply unit, causes the first solenoid valve, and the second solenoid valve to be in the closed state, causes the external solenoid valve to be in the open state, and causes the pressure sensor to acquire a second measurement value, calculates a correction factor indicating a circulation state of the external solenoid valve based on a value of a ratio between the first measurement value and the second measurement value, and determines the first pressure based on the correction factor.

Appendix 9

The fluid mattress according to any one of Appendixes 1 to 8, in which the controller determines a posture of a user based on a ratio between first time during when the measurement value by the pressure sensor changes from the third pressure to a fifth pressure lower than the third pressure and higher than the fourth pressure, and second time during when the measurement value changes from the fifth pressure to the fourth pressure, and increases the first pressure when the posture of the user is a sitting position.

Appendix 10

The fluid mattress according to Appendix 9, in which the controller determines that the posture of the user is a supine position when a value of the ratio of the first time relative to the second time is higher than a threshold, and determines that the posture of the user is the sitting position when the value of the ratio lower than the threshold.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fluid mattress comprising:

a fluid supply unit capable of supplying a fluid;

a fluid path to which the fluid is supplied from the fluid supply unit;

a plurality of first cells connected to each other;

a plurality of second cells connected to each other;

a first solenoid valve including a first end connected to the plurality of first cells and a second end connected to the fluid path;

a second solenoid valve including a first end connected to the plurality of second cells and a second end connected to the fluid path;

an external solenoid valve including a first end connected to an outside and a second end connected to the fluid path;

a pressure sensor that measures a pressure of the fluid in the fluid path; and a controller that receives input of a measurement result by the pressure sensor, and controls the fluid supply unit, the first solenoid valve, the second solenoid valve, and the external solenoid valve, wherein the controller can implement a first mode in which a pressure in the second cell is set to be a first pressure, and a pressure in the first cell is set to be equal to or lower than a second pressure lower than the first pressure, and a second mode in which a pressure in the first cell is set to be the first pressure, and a pressure in the second cell is set to be equal to or lower than the second pressure, and the controller, when implementing the second mode by shifting from the first mode, stops the fluid supply unit, causes the first solenoid valve to be in a closed state, causes the second solenoid valve and the external solenoid valve to be in an open state, measures a duration of time during which a measurement value by the pressure sensor changes from a third pressure lower than the first pressure and higher than the second pressure to a fourth pressure lower than the third pressure and higher than the second pressure, and sets a value of the first pressure based on the duration of time, wherein the value of the first pressure is set to be a first value when the duration of time is a first duration of time and to be a second value greater than the first value when the duration of time is a second duration of time longer than the first duration of time.

2. The fluid mattress according to claim 1, further comprising:

a plurality of third cells connected to each other; and a third solenoid valve including a first end connected to the plurality of third cells and a second end connected to the fluid path, wherein the controller can implement a third mode in which a pressure in the first cell and a pressure in the second cell are set to be the first pressure, and a pressure in the third cell is set to be equal to or lower than the second pressure, and causes the pressure in the third cell to be the first pressure, in the first mode and the second mode.

3. The fluid mattress according to claim 2, wherein the controller when implementing the first mode by shifting, stops the fluid supply unit, causes the second solenoid valve and the third solenoid valve to be in the closed state, causes the first solenoid valve and the external solenoid valve to be in the open state, and calculates a first estimated value of the first pressure based on a duration of time during which the measurement value by the pressure sensor changes from the third pressure to the fourth pressure, when implementing the second mode by shifting, stops the fluid supply unit, causes the first solenoid valve and the third solenoid valve to be in the closed state, causes the second solenoid valve and the external solenoid valve to be in the open state, and calculates a second estimated value of the first pressure based on a duration of time during which the measurement value by the pressure sensor changes from the third pressure to the fourth pressure, when implementing the third mode by shifting, stops the fluid supply unit, causes the first solenoid valve and the second solenoid valve to be in the closed state, causes the third solenoid valve and the external solenoid valve to be in the open state, and calculates a third estimated value of the first pressure based on a duration of time during which the measurement value by the pressure sensor changes from the third pressure to the fourth pressure, and sets an average value of the first estimated value, the second estimated value, and the third estimated value as the value of the first pressure.

4. The fluid mattress according to claim 2, wherein the fluid mattress is disposed on a bed, and the first cell, the second cell, and the third cell are repeatedly arranged from a head side toward a leg side of the bed.

5. The fluid mattress according to claim 2, further comprising a fourth solenoid valve, wherein the first cell includes a first lower cell connected to a first end of the fourth solenoid valve, and a first upper cell disposed above the first lower cell, and connected to the first end of the first solenoid valve, the second cell includes a second lower cell connected to the first end of the fourth solenoid valve, and a second upper cell disposed above the second lower cell, and connected to the first end of the second solenoid valve, the third cell includes a third lower cell connected to the first end of the fourth solenoid valve, and a third upper cell disposed above the third lower cell, and connected to the first end of the third solenoid valve, and a second end of the fourth solenoid valve is connected to the fluid path.

6. The fluid mattress according to claim 2, wherein the controller repeatedly implements the first mode, the second mode, and the third mode.

7. The fluid mattress according to claim 1, wherein the controller sets the value of the first pressure also based on a pressure in the first cell when implementing the second mode by shifting from the first mode.

8. The fluid mattress according to claim 1, wherein the controller drives the fluid supply unit, causes the first solenoid valve, the second solenoid valve, and the external solenoid valve to be in the closed state, and causes the pressure sensor to acquire a first measurement value, drives the fluid supply unit, causes the first solenoid valve, and the second solenoid valve to be in the closed state, causes the external solenoid valve to be in the open state, and causes the pressure sensor to acquire a second measurement value, calculates a correction factor indicating a circulation state of the external solenoid valve based on a value of a ratio between the first measurement value and the second measurement value, and sets the value of the first pressure also based on the correction factor.

9. The fluid mattress according to claim 1, wherein the controller determines a posture of a user based on a ratio between a third duration of time during which the measurement value by the pressure sensor changes from the third pressure to a fifth pressure lower than the third pressure and higher than the fourth pressure, and a fourth duration of time during which the measurement value changes from the fifth pressure to the fourth pressure, and increases the first pressure when the posture of the user is a sitting position.

10. The fluid mattress according to claim 9, wherein the controller determines that the posture of the user is a supine position when a value of the ratio of the third duration of time relative to the fourth duration of time is higher than a threshold, and determines that the posture of the user is the sitting position when the value of the ratio lower than the threshold.

* * * * *